Figure 1:
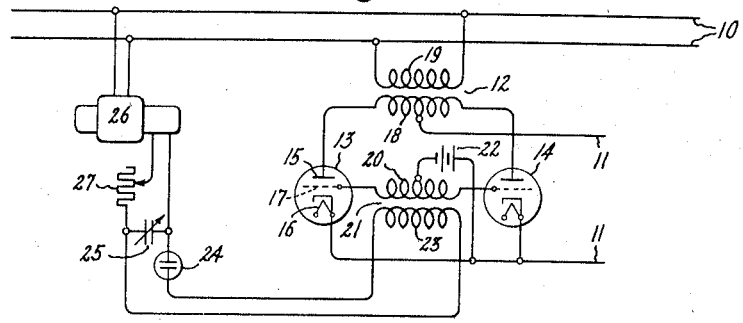

Jan. 2, 1945.   O. W. LIVINGSTON   2,366,537
ELECTRIC CONTROL CIRCUIT
Filed April 23, 1942   2 Sheets-Sheet 1

Inventor:
Orrin W. Livingston,
by Harry E. Dunham
His Attorney.

Patented Jan. 2, 1945

2,366,537

UNITED STATES PATENT OFFICE 2,366,537

ELECTRIC CONTROL CIRCUIT

Orrin W. Livingston, Scotia, N. Y., assignor to General Electric Company, a corporation of New York Application April 23, 1942, Serial No. 440,157

12 Claims. (Cl. 175—363)

My invention relates to electric control circuits and more particularly to improved circuits for producing voltages of peaked wave form for electric valve systems.

For accurate control, particularly in circuits for controlling the ignition of electric valves, the value of steep front voltages has been widely recognized. Such voltages have often been produced from an alternating current source by special transformers having a core section which is saturated during a portion of the alternating current cycle. These transformers are usually bulky and require a large electrical input compared with the energy supplied to the excitation circuit. In accordance with the teachings of my invention I provide an improved circuit which does not require as complicated or bulky a transformer and which also provides an easy means for shifting the phase of the peaked voltages. In other words, I provide, in accordance with the teachings of my invention, an improved circuit for providing voltages of peaked wave form and variable phase relation with respect to an alternating current supply voltage.

It is an object of my invention to provide a new and improved electric control system.

It is another object of my invention to provide a new and improved electrical control circuit for producing voltages of peaked wave form.

It is another object of my invention to provide an improved electric circuit for producing a plurality of independently adjustable control voltages of steep wave front for a cycle of voltage of a single phase supply circuit.

It is still another object of my invention to provide a new and improved electric control circuit for producing voltages of peaked wave form from an alternating current source and variable phase relation with respect to the voltage of the source.

In accordance with illustrated embodiments of my invention I provide a control circuit including a condenser and resistor connected in series across a source of alternating current voltage. Connected across the condenser in series is a glow discharge device and the primary winding of a transformer preferably having a low distributed capacity. The glow discharge device is of the type which requires a voltage of a particular value before it conducts any appreciable current and which continues to conduct at a voltage appreciably lower than the voltage at which conduction is initiated. Or stated in another way, there is a considerable differential between the breakdown and conduction voltages of the device. The constants of the discharge device and the remainder of the circuit are chosen so that the breakdown voltage is reached at a definite time in the alternating current voltage cycle at which time the difference between the breakdown and conduction voltage of the discharge device is suddenly applied to the primary of the transformer winding.

Figure 2:
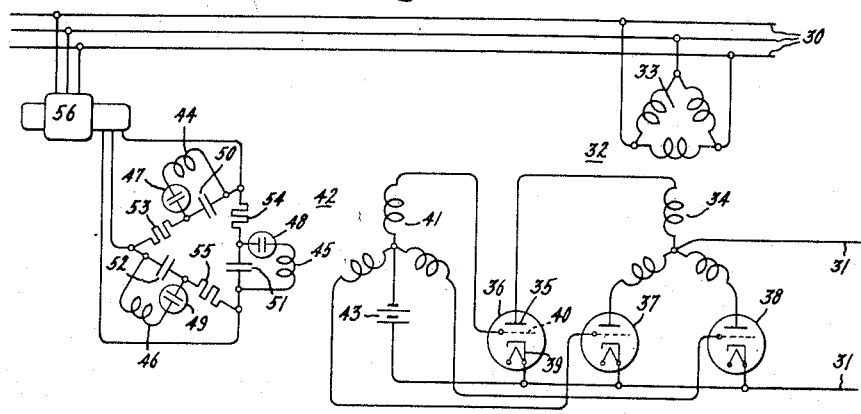
Figure 3:
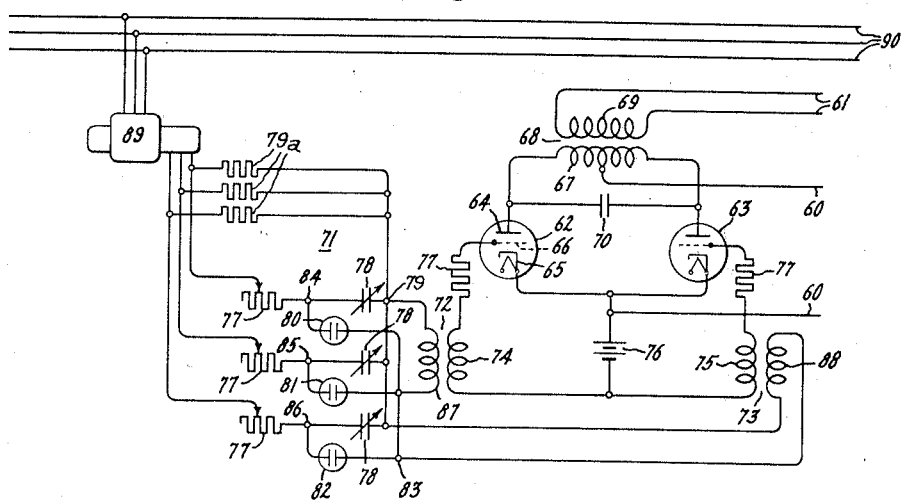
Figure 4:
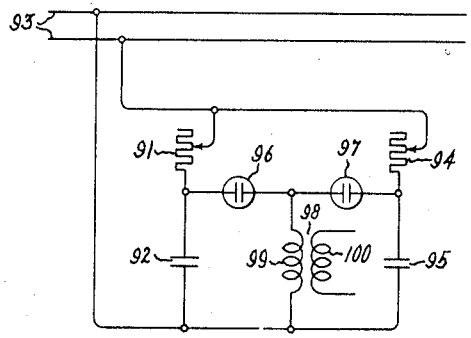
Figure 5:
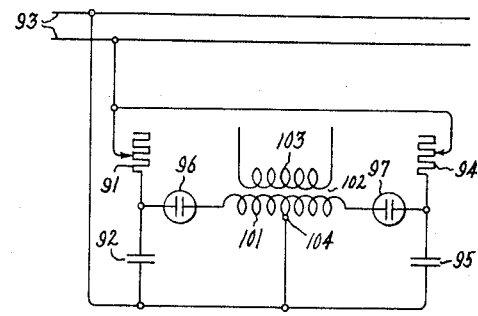
Figure 6:
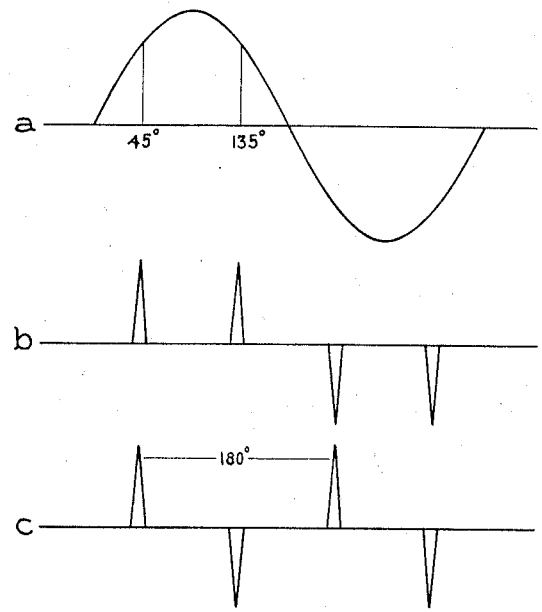

My invention will be better understood by reference to the following description taken in connection with the accompanying drawings and its scope will be pointed out in the appended claims. In the drawings, Fig. 1 is a schematic representation of one embodiment of my invention applied to a simple full wave rectifier; Fig. 2 illustrates a polyphase network embodying my invention for controlling a polyphase rectifier; Fig. 3 represents a modification of my invention embodied in a network for producing voltages of peaked wave form having a frequency higher than the frequency of the alternating current voltage impressed on the network; Figs. 4 and 5 illustrate embodiments of my invention for producing a plurality of voltage peaks for each half cycle of voltage of a single phase source, and Fig. 6 illustrates certain operating characteristics of the arrangements of Figs. 4 and 5.

Referring now to Fig. 1, I have shown my invention embodied in a simple fullwave rectifier system of the controlled type. As illustrated, an alternating current supply circuit 10 and a direct current load circuit 11 are interconnected by a transformer 12 and a pair of electric discharge valves 13 and 14. Each of the valves comprises an envelope containing an ionizable medium, such as a gas or vapor, an anode 15, a cathode 16 and a control member or grid 17. The anodes 15 of valves 13 and 14 are connected respectively with the end terminals of the secondary winding 18 of transformer 12. The winding 18 is provided with a midtap which connects with one side of the direct current circuit 11 while the cathodes of the electric valves are connected together and to the other side of the direct current circuit. The primary winding 19 of the transformer 12 is connected to the alternating current supply circuit 10.

As is well understood by those skilled in the art, the time in the voltage cycle of the anode-cathode circuit of electric valves 13 and 14 at which they are rendered conductive may be controlled by varying the time in this voltage cycle at which the control members 17 thereof are rendered more positive than the critical voltage. Such control is rendered more accurate if the voltage of the control member is changing rapidly at the time that the voltage crosses the critical voltage of the tube. In accordance with the present invention I provide an improved circuit for providing such a voltage.

Referring again to the drawings, the control members 17 are interconnected by the secondary winding 20 of an excitation transformer 21. Winding 20 is provided with a midtap which is connected to the cathodes of electric valves 13 and 14 through a source of negative bias such as a battery 22. The primary winding 23 of the excitation transformer is connected in series with a glow discharge device 24 and across a condenser 25. As illustrated the condenser may be variable. The terminals of the condenser are connected to the output of a phase shifting device 26 through a resistor 27 which is also illustrated as variable. The phase shifting device 26 is energized from the alternating current supply circuit 10.

The discharge device 24 is of the type which conducts substantially no current until a predetermined critical voltage is reached at which time it is rendered conductive and continuous to conduct at a substantially lower terminal voltage. In this way when the voltage across the condenser 25 reaches the critical voltage of the glow discharge device 24, the difference between the critical voltage and the voltage of conduction of device 24 is suddenly impressed on the primary winding 23 of the excitation transformer. The device 24 is extinguished when the condenser voltage falls below the conduction-maintaining voltage of the device 24. While I have shown a phase shifting device 26 for energizing the peaked voltage producing circuit, in many cases it will be found that the adjustment of the phase of the voltage wave across the terminals of the condenser 25 with respect to the alternating current supply circuit may be made by proper adjustment of the magnitude of the condenser 25 or the resistor 27. In order to obtain a voltage peak having a magnitude approaching the difference between the breakdown voltage and voltage of conduction of the glow discharge device multiplied by the turns ratio of the transformer it is essential that the distributive capacity of the transformer winding have a low value as compared with the magnitude of the capacitor which is charged from the alternating circuit and discharged through the glow discharge device. While it is necessary for best operation of the circuit just described that the transformer windings have relatively low distributed capacity, it will be apparent that the transformer core structure may be of conventional design without saturable sections of high permeability nickel-steel alloy such as is used in peaking transformers commonly employed at the present time. In this way the present invention provides a simple and inexpensive arrangement for producing voltages of peaked wave form such as are well adapted for controlling the conductivity of electric valve means and which may be shifted in phase by variation of one of the constants of the peaking circuit.

The arrangement shown in Fig. 2 is very similar to that shown in Fig. 1 except that the invention has been applied to a three phase rectifier and a three phase peaking network embodying the present invention as illustrated. In Fig. 2 a polyphase alternating current supply circuit 30 is interconnected with a direct current load circuit 31 by means of a transformer 32 having a delta-connected primary winding 33 energized from the polyphase alternating current source 30 and a Y-connected secondary winding 34 having the neutral terminal thereof connected to one side of the direct current circuit 31 and the phase terminals thereof connected respectively with the anodes 35 of electric valves 36, 37 and 38. Electric valves 36, 37 and 38 may be of any of the types well known in the art and are preferably similar to valves 13 and 14 of Fig. 1. As illustrated, each comprises an envelope containing an ionizable medium such as a gas or vapor, and includes in addition to the anode 35 a cathode 39 and a control member 40. The control members 40 are connected to the phase terminals of the Y-connected secondary winding 41 of an excitation transformer network 42. The neutral terminal of the winding 41 is connected to the cathode bus of the electric valves 36, 37, 38 through a source of negative bias potential illustrated as a battery 43. Control voltages are induced in the three phase winding 41 by the single phase primary windings 44, 45, 46 which are connected respectively in series with glow discharge devices 47, 48 and 49 and across capacitors 50, 51 and 52. In series with capacitors 50, 51 and 52 are resistors 53, 54 and 55. Each series connected resistor and capacitor is connected to provide one phase of a three phase delta-connected network the phase terminals of which are energized from the output of the phase shifting device 56 preferably of the type comprising relatively movable windings and having one winding thereof energized from the alternating current supply circuit 30.

The operation of the modification illustrated in Fig. 2 will be apparent to those skilled from the preceding description of the operation of the arrangement of Fig. 1. Briefly stated, the differences between the breakdown and conduction voltages of the discharge devices 47, 48 and 49 are suddenly impressed, respectively, on the primary windings 44, 45 and 46 to induce peaked voltages in the secondary winding 41 at intervals displaced from each other by 120 electrical degrees. While I have shown the primary network energized from the output of the phase shifting device the phase of the peak voltages may also be adjusted by adjusting the values of the resistors and capacitors of the network, as described in connection with Fig. 1.

In Fig. 3 I have shown still another modification of my invention in which the peaked voltage producing network is utilized to obtain peaked voltages having a frequency differing from the frequency of the alternating current circuit from which it is energized. Referring now to Fig. 3 I have shown an embodiment of my invention for controlling the excitation of an electric valve inverter for controlling the transfer of energy between a direct supply circuit 60 and an alternating current load circuit 61. The inverter is of the parallel type and comprises a pair of electric discharge valves 62 and 63, each comprising an envelope containing an ionizable medium such as a gas or vapor, an anode 64, a cathode 65 and a control member or grid 66. The cathodes are connected together and to one side of the direct current circuit 60 while the anodes are connected to the end terminals of the primary winding 67 of a transformer 68, the secondary winding 69 of which energizes the alternating current load circuit 61. The transformer primary winding 67 is provided with a midtap connected to the other side of the direct current supply circuit. A suitable commutating capacitor 70 is connected between the anodes of the electric valves. As is well understood by those skilled in the art, the circuit just described may be operated to transfer energy from the direct current 60 to the alternating current 61 at a frequency determined by the frequency at which the electric valves 62 and 63 are rendered alternatively conductive and non-conductive. As illustrated in the drawings, the control members 66 of electric valves 62 and 63 are energized according to the output of a phase shifting and voltage peaking network 71 by means of excitation transformers 72 and 73. The secondary windings 74 and 75 of transformers 72 and 73 have one terminal thereof connected together and to the cathodes of electric valves 62 and 63 through a source of negative bias potential, such as a battery 76. The other terminals of the windings 74 and 75, respectively, are connected to the control member 66 of electric valves 62 and 63 through suitable current limiting resistors 77. It will be understood that current limiting resistors will be used in the grid circuits of the arrangements of Figs. 1 and 2 in accordance with common practice. The network 71 comprises a three phase Y-connected network with each phase including a resistor 77 and a capacitor 78 in series. The potential of the neutral terminal 79 of the network is established by connecting it with the neutral terminal of the three Y-connected resistors 79a. Space discharge devices 80, 81 and 82 are connected to provide a three phase Y-connected network including a neutral terminal 83 and three phase terminals which are connected respectively to the common terminals 84, 85 and 86 of the resistors 77 and capacitors 78 of each phase of the three phase network. Primary windings 87 and 88 of the transformers 72 and 73 respectively are connected between the neutral terminals 79 and 83. The network 71 is energized from the output of a polyphase phase shifting device 89 which in turn is energized from a polyphase alternating current source 90. From an inspection of the drawings it is apparent that the difference between the breakdown voltage and the voltage of conduction of one of the discharge devices 80, 81, 82 appears across the neutral terminals 79 and 83 once during each half cycle of voltage across any of the three condensers. That is, voltages are suddenly impressed on primary windings 87 and 88 six times for each cycle of voltage impressed on the network 71. The peaked voltages thus have a periodicity equal to the product of the frequency of circuit 90 and the number of phases of network 71. It will be apparent to those skilled in the art that the voltages impressed on the control members 66 cooperate with commutating capacitor 70 to render the electric valves 62 and 63 alternately conducting and non-conducting at the frequency of the peaked voltages, or in other words to operate the inverter at three times the frequency of the alternating current circuit 90.

In Figs. 4 and 5 I have shown embodiments of my invention for producing a plurality of voltage peaks per half cycle of voltage of a single phase supply circuit. These voltage peaks are independently adjustable in position relative to each other. In Fig. 4 the two voltage peaks produced during one half cycle of the supply circuit voltage are of the same polarity and the succeeding two voltage peaks are of opposite polarity, while in the arrangement shown in Fig. 5 every other peak is of opposite polarity with the periodicity of the voltage peaks being double that of the supply frequency. In the arrangement shown in Fig. 4 a variable resistor 91 and a capacitor 92 are connected in series and energized by the voltage of a single phase alternating current supply circuit 93. A second series connected variable resistor 94 and capacitor 95 are connected in parallel with resistor 91 and capacitor 92 for energization from the supply circuit 93. Series connected glow discharge devices 96 and 97, having characteristics similar to those described in connection with the preceding figures, are connected in series between the common terminal of resistor 91 and capacitor 92 and the common terminal of resistor 94 and capacitor 95. The output circuit of the control voltage producing system is provided by a transformer 98 having the primary winding connected between the common terminal of the glow discharge devices 96 and 97 and the common terminal of the capacitors 92 and 95. The secondary winding 100 of the transformer provides the output circuit and may comprise one or more sections in accordance with the particular controlling action that it is desired to effect with the peaked voltages produced.

The operation of the arrangement shown in Fig. 4 is in general similar to the operation of the arrangements previously described. However, the operating features of these arrangements will be more readily understood by reference to Fig. 6 which shows in curve a, a sinusoidal voltage which represents the voltage of source 93. Curve b of Fig. 6 illustrates the arrangement of voltage peaks produced by the arrangement of Fig. 4. It will be noted that two peaks are produced during each half cycle of the supply line voltage and that these peaks are of the same polarity. It will be understood that the spacing of these peaks may be adjusted independently by adjusting resistors 91 and 94 or capacitors 92 and 95, and as illustrated are evenly spaced 90 degrees apart.

In Fig. 5 I have shown an embodiment of my invention which is very similar to the arrangement shown in Fig. 4 with the exception that instead of connecting one terminal of each of the glow tubes directly together these terminals are connected together through the primary winding 101 of an output transformer 102 having a secondary winding 103. The primary winding 101 is provided with an intermediate terminal which is connected to the common terminal of the capacitors 92 and 95. The operation of this modification is believed to be apparent from the description of the operation of the preceding modifications. It will be apparent that the voltage peaks produced in the transformer secondary 103 due to the circuit comprising resistor 92, capacitor 95 and glow discharge device 97 will be reversed with respect to the voltage peaks produced by this same resistor-condenser-glow discharge device combination in the modification shown in Fig. 4. Thus the arrangement of voltage peaks produced by the circuit of Fig. 5 when the resistance and capacitance circuits are adjusted so that discharge tube 96 breaks down 90 degrees prior to the time that discharge tube 97 breaks down, is shown in Fig. 6c. In other words, the voltages are arranged symmetrically and are of double the frequency of the single phase supply. It will be understood that the voltages produced by the two resistor-condenser-glow discharge device circuits may be displaced variable amounts with respect to each other by adjustment of the constants of one or the other of the circuits.

While I have disclosed and described particular embodiments of my invention, it will occur to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current supply circuit, a series circuit including a resistor and capacitor connected for energization from said alternating current supply circuit, a discharge device having a breakdown voltage and a lower voltage of conduction and a transformer winding connected in series across said capacitor, the constants of said resistor, capacitor, and discharge device being such that said capacitor charges to the breakdown voltage of said discharge device once during each half cycle of voltage of said alternating current supply circuit so that the difference between the breakdown voltage and voltage of conduction of said discharge device is suddenly impressed on said transformer winding once during each half cycle of voltage of said alternating current supply circuit.

2. A peaked voltage producing circuit comprising a polyphase network having a neutral terminal with each phase of the network including a resistance and capacitance in series, a polyphase network of discharge devices having a neutral terminal, and phase terminals, the latter terminals being connected respectively with the common terminals of the resistance and capacitance of each phase of said first mentioned network, said devices having a voltage of conduction definitely lower than the breakdown voltage thereof, and a load circuit connected between said neutral terminals so that the difference between the breakdown voltage and voltage of conduction of one of said devices is impressed on said load circuit when the voltage of the capacitor in any one of the phases exceeds the breakdown voltage of one of the devices to impress suddenly a voltage across the load circuit having a periodicity dependent upon the frequency of the alternating current voltage impressed on the first mentioned network and the number of phases of said network.

3. An alternating current supply circuit, a transformer including a primary winding and a secondary winding, a series connected resistor and capacitor connected for energization from said alternating current supply circuit, a discharge device having a breakdown voltage and a lower voltage of conduction connected in series with the primary winding of said transformer and across said discharge device, the constants of said resistor, capacitor, and discharge device having such a value that said capacitor charges to the breakdown voltage of said discharge device during each half cycle of voltage of said alternating current supply circuit so that the difference between the breakdown voltage and voltage of conduction of said discharge device is suddenly impressed on said primary winding during each half cycle of voltage of said alternating current supply circuit to induce a voltage of peaked wave form in the secondary winding of said transformer.

4. In combination, an alternating current supply circuit, a transformer having a primary winding and a secondary winding, an energy storage device, a charging circuit for said energy storage device including said source of alternating current and an impedance element in series, a discharge circuit for said energy storage device comprising a discharge device having a breakdown voltage and a lower voltage of conduction, said discharge device being connected in series with the primary winding of said transformer and across said energy storage device, the constants of said charging circuit being such that the energy storage device reaches the breakdown voltage of said space discharge device during each half cycle of voltage of said alternating current supply circuit to impress periodically on said transformer primary winding a voltage equal to the difference between the breakdown and conduction voltage of said discharge device to induce a voltage of peaked wave form in the secondary winding of said transformer.

5. In combination, a single phase alternating current supply circuit, a plurality of circuits connected in parallel for energization from said single phase alternating current supply circuit and each comprising a condenser and an impedance in series, the magnitude of the impedances and condensers of the two circuits being such that the voltage of the two condensers reaches a predetermined magnitude at different times in the voltage cycle of said supply circuit, a plurality of glow discharge devices each energized in accordance with the voltage of one of said condensers, said discharge devices having a breakdown voltage and a lower voltage of conduction so that the difference of the breakdown voltage and voltage of conduction is suddenly impressed on said load circuit to produce $n$ peaked wave form voltages per half cycle of voltage of said source in said load circuit where $n$ is the number of condenser impedance circuits energized from said source.

6. In combination, an alternating current supply circuit, a plurality of series circuits each including a capacitor and impedance and energized in parallel from said alternating current circuit, a pair of discharge devices each having a breakdown voltage and a lower voltage of conduction and each having one terminal connected with the common terminal of the impedance and capacitance of one of said series circuits, a transformer having a winding with an intermediate terminal and a pair of end terminals each of said end terminals being connected with one of the terminals of one of said discharge devices and said intermediate terminal being connected with the common terminal of said capacitor so that voltage peaks of opposite polarity are induced in said secondary winding for each half cycle of voltage of said supply circuit.

7. In combination, an alternating current supply circuit, a plurality of series circuits including a condenser and an impedance in series therewith for controlling the charging rate thereof, each of said series circuits being connected for energization in parallel from said supply circuit, the impedance and capacitor in each of said circuits having a magnitude so that each of said condensers is charged to a predetermined voltage at a different time in the voltage wave of said supply circuit, and a discharge device having a definite breakdown voltage and a lower voltage of conduction connected to be energized in accordance with the voltage of said condensers, and a load circuit connected so that the difference between the breakdown voltage and the voltage of conduction of each of said discharge devices is suddenly impressed on said load circuit each time one of said condensers is charged to the breakdown voltage of the device connected therewith to produce plurality of voltage impulses in said load circuit per cycle of said supply circuit.

8. In combination, an alternating current supply circuit, a series circuit energized from said supply circuit including a capacitor and an impedance for controlling the rate of charge of said capacitor, a transformer including a primary winding and a secondary winding, means for controlling the discharge of said condenser through said primary winding so that at least a portion of the capacitor voltage is suddenly impressed on said primary winding during a half cycle of alternating current voltage of said supply circuit, the distributed capacity of said transformer windings being small compared with the magnitude of said capacitor so that the magnitude of the voltage induced in the secondary winding approaches the magnitude of the voltage suddenly impressed on said primary winding multiplied by the turns ratio of the transformer.

9. In combination, a supply circuit, a load circuit, at least one of said circuits being an alternating current circuit, electric valve means interconnecting said circuits for controlling the transfer of energy therebetween, control electrodes for controlling the conductivities of said electric valve means, a second alternating current circuit having a frequency which is a fraction of the frequency of said first mentioned alternating current circuit, and means for producing voltages of peaked wave form of the frequency of said first mentioned alternating current circuit for controlling the energization of said control electrodes comprising an excitation network having a pair of output terminals and a plurality of circuits for suddenly impressing a voltage of short duration with respect to the voltage of said second mentioned alternating current circuit on said output terminals.

10. In combination, a supply circuit, a load circuit, at least one of said circuits being an alternating current circuit, a plurality of electric valves interconnecting said circuits, control electrodes for controlling the conductivities of said electric valves and a control circuit for energizing said control electrodes for rendering said electric valves selectively conductive at the frequency of said alternating current circuit comprising a source of alternating current voltage having a frequency which is a fraction of the frequency of the voltage of said first mentioned alternating current circuit, a plurality of static networks each including a condenser connected for energization from said second mentioned alternating current circuit, a pair of output terminals common to all of said networks, each of said networks including means for suddenly impressing at least a portion of the voltage of the condenser of that network on said output terminals once during each half cycle of the voltage of said second mentioned alternating current circuit, and means for effecting the energization of said control electrodes in accordance with the voltage of said output terminals.

11. In combination, a supply circuit, a load circuit, at least one of said circuits being an alternating current circuit, electric valve means interconnecting said circuits, a control electrode for controlling the conductivity of said electric valve means, a transformer having a pair of windings one of which is connected with said control electrode, a condenser, means for charging said condenser from said alternating current circuit, a discharge circuit for said condenser including the other winding of said transformer, means comprising a glow discharge device connected in series relation in said discharge circuit for effecting the discharge of said condenser through said other transformer winding during each half cycle of the voltage of said alternating current circuit, and means for controlling the charging rate of said condenser to vary the instant that said condenser is discharged and thereby control the time in the voltage cycle of said alternating current circuit that said valve means is rendered conductive.

12. In combination, an alternating current supply circuit, an output circuit comprising a pair of terminals, a plurality of static circuits each comprising a series connected impedance element and a capacitor connected to be energized in parallel from one phase of said alternating current supply circuit, and means for discharging each of said capacitors at different times during each half cycle of the voltage of said supply circuit through said output terminals during a period of short duration relative to the period of said alternating current supply circuit to impress a plurality of voltage impulses on said output terminals per half cycle of voltage of said supply circuit.

ORRIN W. LIVINGSTON.